US011107290B1

United States Patent
Peri et al.

(10) Patent No.: US 11,107,290 B1
(45) Date of Patent: Aug. 31, 2021

(54) DEPTH MAP RE-PROJECTION ON USER ELECTRONIC DEVICES

(71) Applicant: Samsung Electronics Company, Ltd., Suwon Si (KR)

(72) Inventors: Christopher A. Peri, Mountain View, CA (US); Yingen Xiong, Mountain View, CA (US); Lu Luo, Sunnyvale, CA (US)

(73) Assignee: SAMSUNG ELECTRONICS COMPANY, LTD., Suwon (KR)

( * ) Notice: Subject to any disclaimer, the term of this patent is extended or adjusted under 35 U.S.C. 154(b) by 0 days.

(21) Appl. No.: 16/942,627

(22) Filed: Jul. 29, 2020

Related U.S. Application Data

(60) Provisional application No. 62/982,570, filed on Feb. 27, 2020.

(51) Int. Cl.
 *G06T 19/00* (2011.01)
 *G02B 27/00* (2006.01)
 (Continued)

(52) U.S. Cl.
 CPC ........ *G06T 19/006* (2013.01); *G02B 27/0093* (2013.01); *G06T 7/73* (2017.01); *G06T 15/205* (2013.01); *H04N 13/128* (2018.05); *G06T 2207/10024* (2013.01); *G06T 2207/10028* (2013.01)

(58) Field of Classification Search
 CPC ....... G06T 19/006; G06T 7/73; G06T 15/205; H04N 13/128; G02B 27/0093
 See application file for complete search history.

(56) References Cited

U.S. PATENT DOCUMENTS 9,443,355 B2 9/2016 Chan
10,326,500 B1 6/2019 Qu
(Continued)

FOREIGN PATENT DOCUMENTS

| EP | 0955606 A2 | 11/1999 |
|---|---|---|
| KR | 10-2011-0112143 A | 10/2011 |
| KR | 10-2018-0060868 A | 6/2018 |

OTHER PUBLICATIONS

Badias, Alberto, et al. "Reduced order modeling for physically-based augmented reality." Computer Methods in Applied Mechanics and Engineering 341 (2018): 53-70.*

*Primary Examiner* — Sarah Lhymn
(74) *Attorney, Agent, or Firm* — Baker Botts L.L.P.

(57) ABSTRACT

A method includes rendering, on displays of an extended reality (XR) display device, a first sequence of image frames based on image data received from an external electronic device associated with the XR display device. The method further includes detecting an interruption to the image data received from the external electronic device, and accessing a plurality of feature points from a depth map corresponding to the first sequence of image frames. The plurality of feature points includes movement and position information of one or more objects within the first sequence of image frames. The method further includes performing a re-warping to at least partially re-render the one or more objects based at least in part on the plurality of feature points and spatiotemporal data, and rendering a second sequence of image frames corresponding to the partial re-rendering of the one or more objects.

30 Claims, 14 Drawing Sheets

(51) Int. Cl.
   *G06T 7/73*      (2017.01)
   *G06T 15/20*     (2011.01)
   *H04N 13/128*    (2018.01)

(56) References Cited

U.S. PATENT DOCUMENTS

| | | |
|---|---|---|
| 2011/0249122 A1 | 10/2011 | Tricoukes |
| 2014/0118482 A1 | 5/2014 | Noh |
| 2016/0248995 A1 | 8/2016 | Mullins |
| 2016/0267717 A1 | 9/2016 | Bar-Zeev |
| 2017/0084074 A1 | 3/2017 | Hwang |
| 2017/0155889 A1 | 6/2017 | Chien |
| 2018/0278918 A1 | 9/2018 | Peri |
| 2019/0041976 A1 | 2/2019 | Veeramani |
| 2019/0333263 A1 | 10/2019 | Melkote Krishnaprasad |
| 2020/0098186 A1* | 3/2020 | Xue ................ H04N 21/42201 |
| 2020/0410766 A1* | 12/2020 | Swaminathan ....... G06T 19/006 |

* cited by examiner

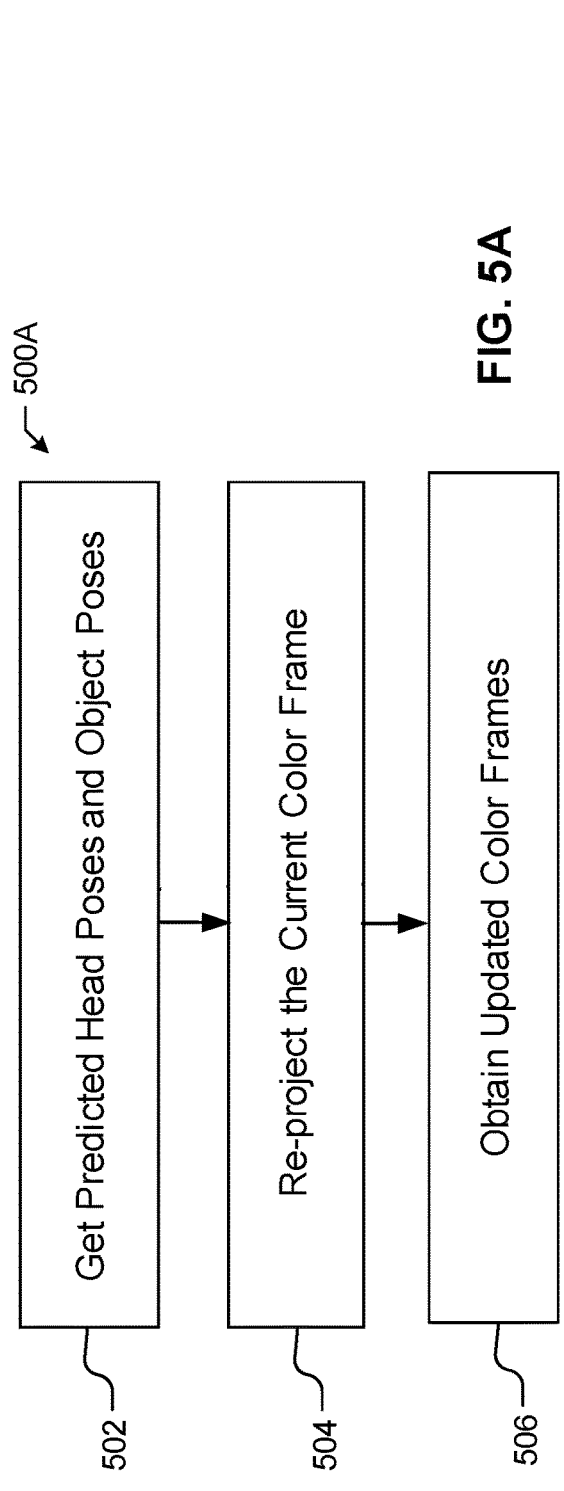
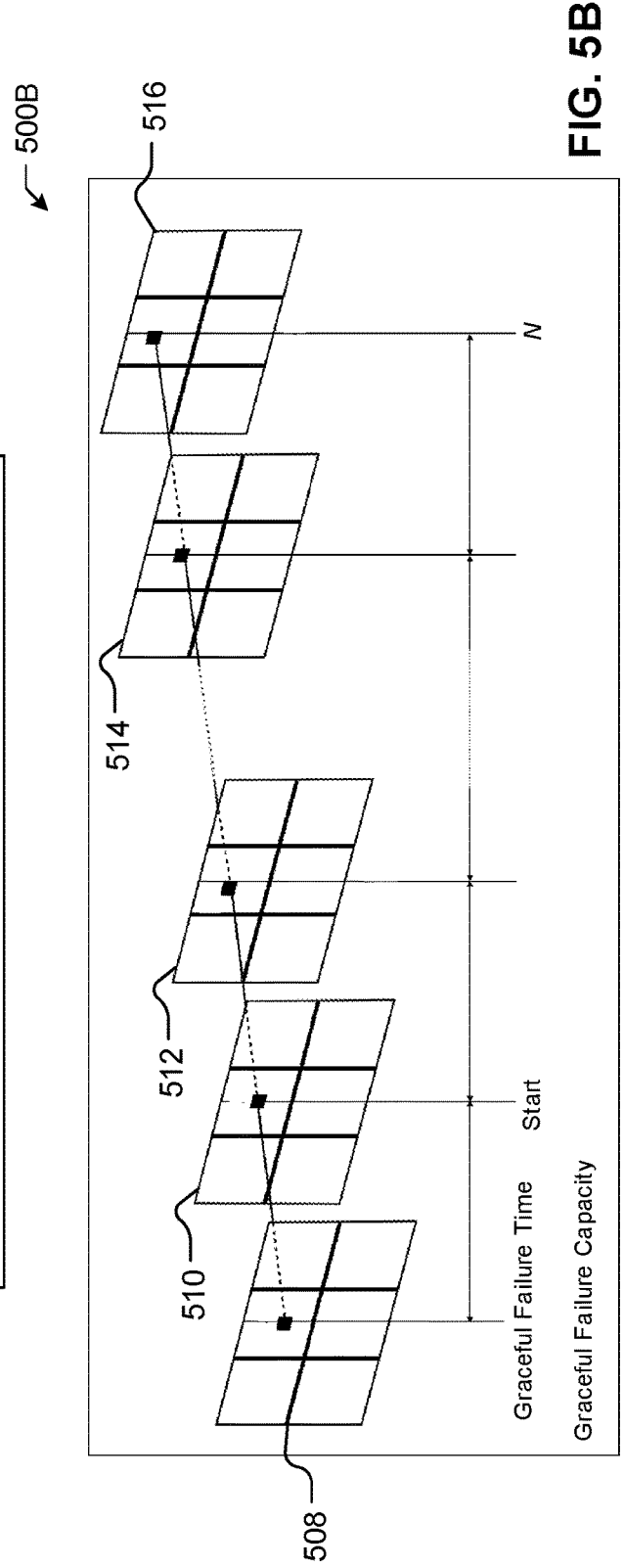

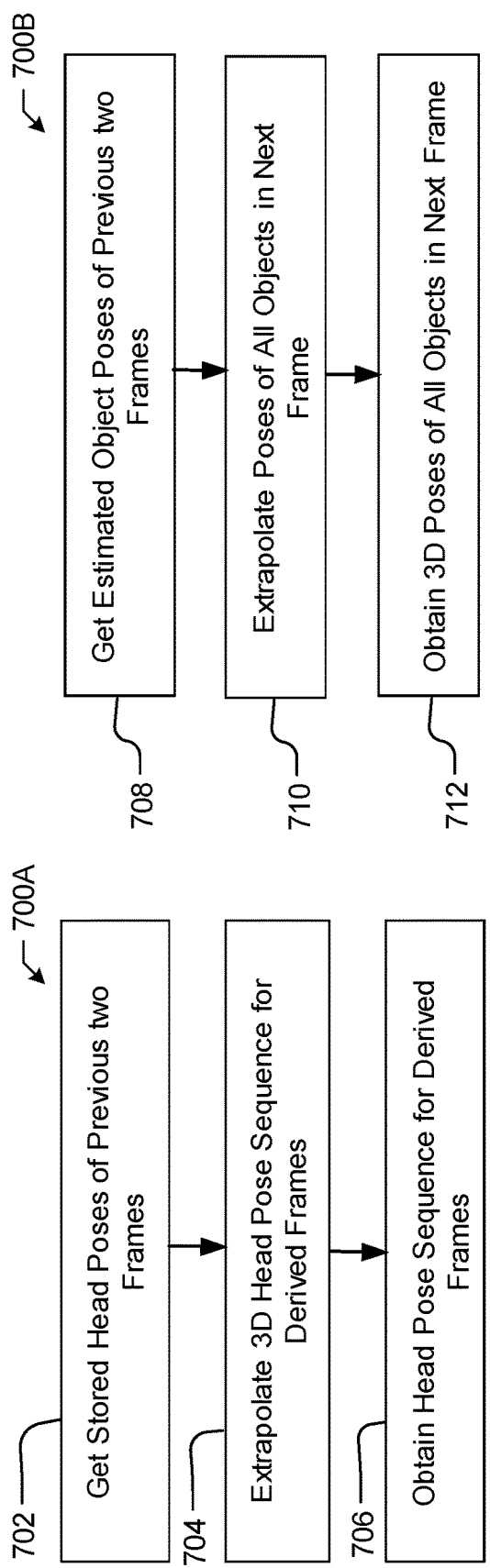
FIG. 7A
FIG. 7B
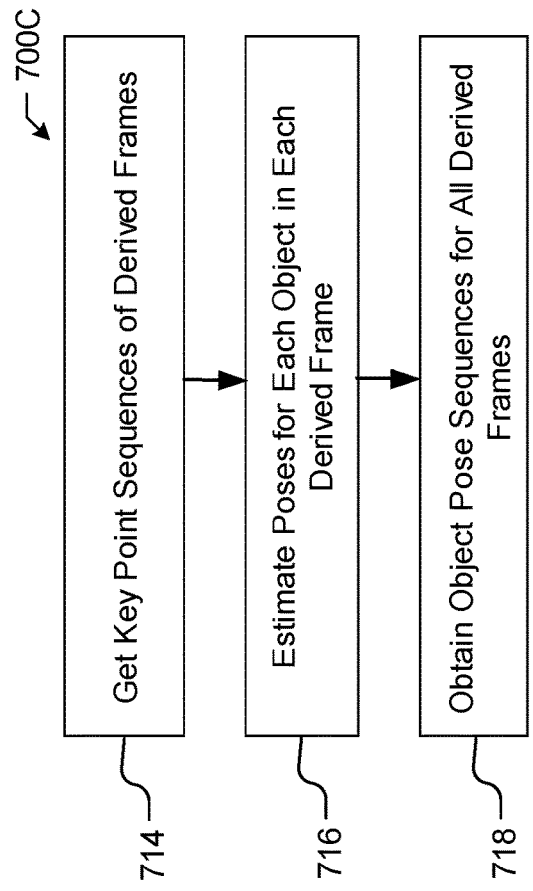
FIG. 7C

DEPTH MAP RE-PROJECTION ON USER ELECTRONIC DEVICES

PRIORITY

This application claims the benefit under 35 U.S.C. § 119(e) of U.S. Provisional Patent Application No. 62/982,570, filed 27 Feb. 2020, which is incorporated herein by reference.

TECHNICAL FIELD

This disclosure relates generally to depth maps, and, more particularly, to the re-projection of depth maps on user electronic devices.

BACKGROUND

An extended reality (XR) system may generally include a computer-generated environment and/or a real-world environment that includes at least some XR artifacts. Such an XR system or world and associated XR artifacts typically include various applications (e.g., video games), which may allow users to utilize these XR artifacts by manipulating their presence in the form of a computer-generated representation (e.g., avatar). In typical XR systems, image data may be rendered on, for example, a lightweight, head-mounted display (HMD) that may be coupled through a physical wired connection to a base graphics generation device responsible for generating the image data. In some instances, it may be desirable to couple the HMD to the base graphics generation device via a wireless network connection. However, certain wireless network connections may suffer reliability issues, causing the user's XR experience to cease abruptly and without any preceding indication. It may be thus useful to provide techniques to improve XR systems.

BRIEF DESCRIPTION OF THE DRAWINGS

FIGS. 5A and 5B illustrate workflow diagram for determining one or more current color frames and a frame extrapolation diagram, respectively.

FIGS. 7A, 7B, and 7C illustrate a workflow diagrams for determining and estimating head poses and object poses in the most recent image frames and/or derived image frames, respectively.

DESCRIPTION OF EXAMPLE EMBODIMENTS

Figure 1:
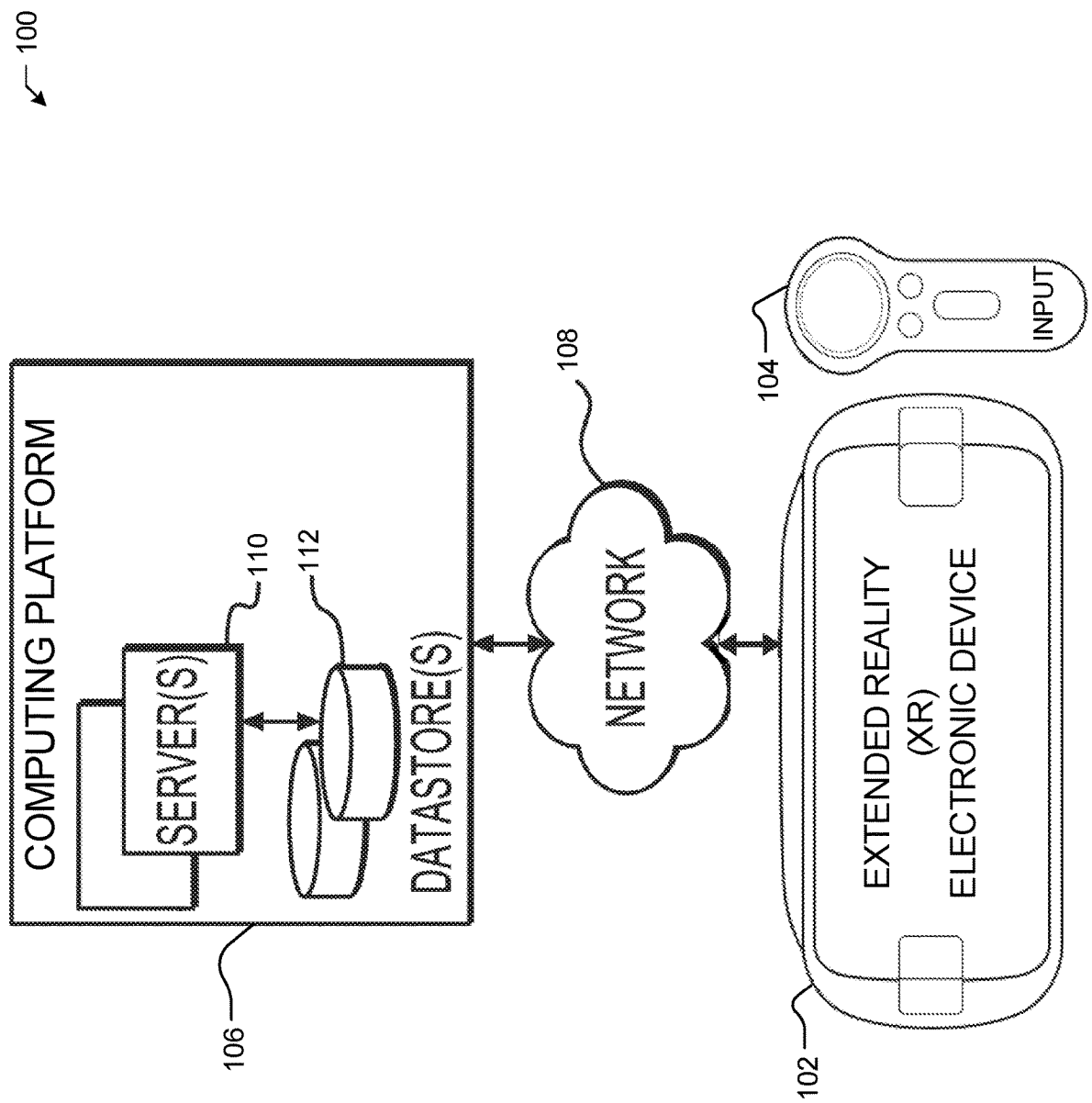
FIG. 1 illustrates an example extended reality (XR) system.

The present embodiments are directed toward re-projecting depth maps on user electronic devices. In particular embodiments, an extended reality (XR) electronic device may render, on one or more displays of the XR electronic device, a first sequence of image frames based on image data received from a computing platform associated with the XR electronic device. The XR electronic device may then detecting an interruption to the image data received from the computing platform associated with the XR display device. In particular embodiments, the XR electronic device and the computing platform may be communicatively connected to each other via a wireless connection, in which the interruption is an interruption to the wireless connection. In particular embodiments, the computing platform may access a number of feature points from a depth map corresponding to the first sequence of image frames, in which the number of feature points may include movement and position information of one or more objects within the first sequence of image frames.

In particular embodiments, prior to detecting the interruption to the image data received from the computing platform, the XR electronic device may receive the number of feature points corresponding to the first sequence of image frames from the computing platform as a background process. In particular embodiments, the XR electronic device may then store, to a memory of the XR electronic device, the number of feature points corresponding to the first sequence of image frames. In particular embodiments, the XR electronic device may perform a re-warping process to at least partially re-render the one or more objects based at least in part on the plurality of feature points and spatiotemporal data. In particular embodiments, the XR electronic device may access current head pose data and predicted head pose data, in which the current head pose data and the predicted head pose data may be associated with the number of feature points. In particular embodiments, the XR electronic device may also access current object pose data and predicted object pose data, in which the current object pose data and the predicted object pose data may be associated with the number of feature points.

In particular embodiments, the XR electronic device may perform the re-warping process by determining one or more current color frames corresponding to the first sequence of image frames, and generating, based on the one or more current color frames, one or more updated color frames corresponding to the first sequence of image frames. In particular embodiments, the XR electronic device may render, on the one or more displays of the XR electronic device, a second sequence of image frames corresponding to the partial re-rendering of the one or more objects. In this way, if a wireless network connection becomes temporarily unavailable, the second sequence of image frames may be rendered for a predetermined period of time thereafter, or until second image data is received again from the computing platform. Thus, the user's XR experience may not cease abruptly, and, instead, may gradually and gracefully cease rendering in the case of network unavailability.

The present embodiments are further directed toward for providing depth map feature points for re-projecting depth maps on user electronic devices. In particular embodiments a computing platform may generate image data corresponding to a first sequence of image frames. In particular embodiments, the computing platform may also access a depth map corresponding to the first sequence of image frames. In particular embodiments, the depth map may include depth information for one or more most recent image frames of the first sequence of image frames. In particular embodiments, the computing platform may also determine a number of feature points from the depth map corresponding to the first sequence of image frames based at least in part on a parametric data reduction (PDR) process, in which the number of feature points may include movement and position information of one or more objects within the first sequence of image frames.

In particular embodiments, the computing platform may determine the number of feature points from the depth map may by selecting a subset of feature points of a total set of feature points included in the depth map. In particular embodiments, the computing platform may also determine the number of feature points from the depth map by determining a plurality of feature points within a predetermined viewing area. In particular embodiments, the computing platform may determine the number of feature points within the predetermined viewing area by determining a number of feature points within a predefined fovea display area. In particular embodiments, the number of feature points within the predefined fovea display area may include a grouping of feature points based at least part on a nearest-neighbor interpolation. In particular embodiments, the grouping of feature points may include a subgrouping of feature points grouped based at least part on a depth calculation. In particular embodiments, the computing platform may determine the number of feature points by determining a pixel region corresponding to the one or more objects within the first sequence of image frames, and dividing the pixel region corresponding to the one or more objects into N pixel subregions.

In particular embodiments, the computing platform may then extract a number of feature points from the N pixel subregions, in which each of the number of feature points is extracted from a respective one of the N pixel subregions based on a confidence threshold. In particular embodiments, the computing platform may determine a position and an optical flow for each of the plurality of feature points. In particular embodiments, the computing platform may then send the image data and the number of feature points to an XR electronic device that is external to the electronic device. In particular embodiments, the computing platform and the XR display device may be communicatively connected to each other via a wireless connection. In particular embodiments, the computing platform may also provide current head pose data and predicted head pose data to the XR electronic device, in which the current head pose data and the predicted head pose data may be associated with the number of feature points. In particular embodiments, the computing platform may also provide current object pose data and predicted object pose data to the XR electronic device, in which the current object pose data and the predicted object pose data are associated with the number of feature points. In this way, if a wireless network connection becomes temporarily unavailable, the second sequence of image frames may be rendered for a predetermined period of time thereafter, or until second image data is received again from the computing platform. Thus, the user's XR experience may not cease abruptly, and, instead, may gradually and gracefully cease rendering in the case of network unavailability.

As used herein, "extended reality" may refer to a form of electronic-based reality that has been manipulated in some manner before presentation to a user, including, for example, virtual reality (VR), augmented reality (AR), mixed reality (MR), hybrid reality, simulated reality, immersive reality, holography, or any combination thereof. For example, "extended reality" content may include completely computer-generated content or partially computer-generated content combined with captured content (e.g., real-world images). In some embodiments, the "extended reality" content may also include video, audio, haptic feedback, or some combination thereof, any of which may be presented in a single channel or in multiple channels (such as stereo video that produces a three-dimensional (3D) effect to the viewer). Further, as used herein, it should be appreciated that "extended reality" may be associated with applications, products, accessories, services, or a combination thereof, that, for example, may be utilized to create content in extended reality and/or utilized in (e.g., perform activities) in extended reality. Thus, "extended reality" content may be implemented on various platforms, including a head-mounted device (HMD) connected to a host computer system, a standalone HMD, a mobile device or computing system, or any other hardware platform capable of providing extended reality content to one or more viewers.

FIG. 1 illustrates an example extended reality (XR) system 100, in accordance with presently disclosed embodiments. In particular embodiments, the XR system 100 may include an XR electronic device 102, an input device 104, and a computing platform 106. In particular embodiments, a user may wear the XR electronic device 102 that may display visual extended reality content to the user. The XR electronic device 102 may include an audio device that may provide audio extended reality content to the user. In particular embodiments, the XR electronic device 102 may include one or more cameras which can capture images and videos of environments. The XR electronic device 102 may include an eye tracking system to determine the vergence distance of the user. In some embodiments, the XR electronic device 102 may include a head-mounted display (HDM). The input device 104 may include, for example, a trackpad and one or more buttons. The input device 104 may receive inputs from the user and relay the inputs to the computing platform 106 and/or the XR electronic device 102. In particular embodiments, the XR electronic device 102 may be coupled to the computing platform 106 via one or more wireless networks 108. In particular embodiments, the computing platform 106 may include, for example, a standalone host computing system, an on-board computer system integrated with the XR electronic device 102, a mobile device, or any other hardware platform that may be capable of providing extended reality content to and receiving inputs from the input device 104. In particular embodiments, the computing platform 106 may include, for example, a cloud-based computing architecture (including one or more servers 110 and data stores 112) suitable for hosting and servicing XR applications or experiences executing on the XR electronic device 102. For example, in particular embodiments, the computing platform 106 may include a Platform as a Service (PaaS) architecture, a Software as a Service (SaaS) architecture, and an Infrastructure as a Service (IaaS), or other similar cloud-based computing architecture.

Figure 2A:
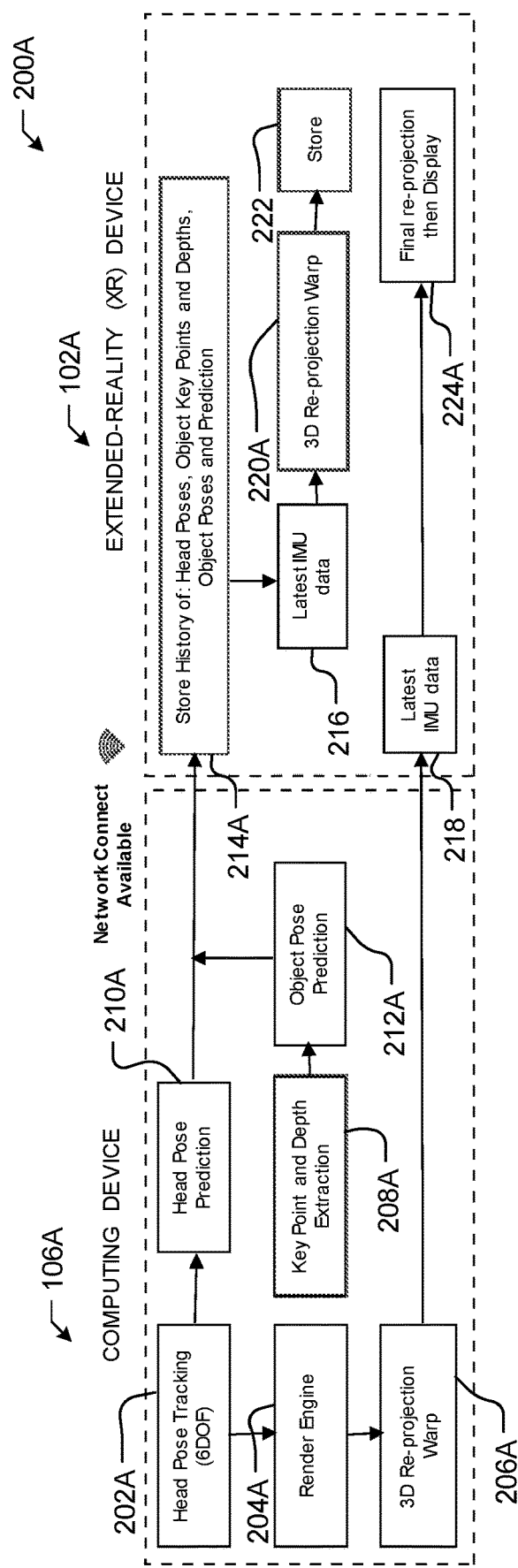
FIG. 2A illustrates a detailed embodiment of an extended reality (XR) system with an available network connection.

FIG. 2A illustrates a detailed embodiment of an extended reality (XR) system 200A for performing a 3D re-projection warping process, in accordance with presently disclosed embodiments. As depicted, while a wireless network connection is available, the computing platform 106A may include a head pose tracking functional block 202A, a rendering engine 204A, a 3D re-projection warping functional block 206A, a key feature point and depth extraction functional block 208A, a head pose functional block 210A, and object pose prediction functional block 212A. In particular embodiments, the computing platform 106 may generate image data corresponding to a first sequence of image frames via the rendering engine 204A. In particular embodiments, the computing platform 106A may also access a depth map corresponding to the first sequence of image frames. In particular embodiments, the depth map may include depth information for one or more most recent image frames of the first sequence of image frames. In particular embodiments, the computing platform 106A may also determine, by the key feature point and depth extraction functional block 208A, a number of feature points from the depth map corresponding to the first sequence of image frames based on a PDR process. In particular embodiments, the number of feature points may include movement and position information (e.g., head pose data and head pose prediction data calculated by the head pose functional block 210A, object pose data and object pose prediction data by the object pose prediction functional block 212A) of one or more objects within the first sequence of image frames.

In particular embodiments, as further depicted by FIG. 2A, the computing platform 106A may then send the image data and a number of feature points to the XR electronic device 102A. In particular embodiments, the XR electronic device 102A may include the storage functional block 214A, a latest inertial measurement unit (IMU) functional block 216, a latest IMU functional block 218, a 3D re-projection warping functional block 220A, a data store 222, and a final re-projection and display functional block 224A. In one example, the latest IMU functional block 216 may include IMU data captured at the time the head pose data and/or object pose data is stored or calculated at the storage functional block 214A, such that the head pose data and/or object pose data may be implied based on the IMU data from the latest IMU functional block 216. In one example, the latest IMU functional block 218 may include real-time or near real-time IMU data that may be recalculated (e.g., updated) before the first sequence of image frames are provided by the final re-projection and display functional block 224A (e.g., when the network connection is still available) for rendering. The storage functional block 214A that may be utilized to receive and store the number of feature points corresponding to the first sequence of image frames from the computing platform 106A as a background process. In particular embodiments, the XR electronic device 102A may also receive current head pose data and predicted head pose data from the computing platform 106A. In particular embodiments, the XR electronic device 106A may also receive current object pose data and predicted object pose data from the computing platform 106A. For example, in particular embodiments, the current head pose data, predicted head pose data, current object pose data, and predicted object pose data may be associated spatiotemporally with the number of feature points received from the computing platform 106A. In particular embodiments, while the wireless network connection is available, the XR electronic device 102A may then render, on one or more displays of the XR display device 102A, the first sequence of image frames by the final re-projection and display functional block 224A. For example, the 3D re-projection warping functional block 206A may provide the first sequence of image frames (e.g., 3D images) to the latest IMU functional block 218 to associate the first sequence of image frames with the latest user head pose data and object pose data, for example, and re-project and display the first sequence of image frames on the one or more displays of the XR display device 102A. In particular embodiments, the wireless network connection may, in some instances, be become temporarily unavailable, and thus the first sequence of image frames may cease being be sent from the computing platform 106A to the XR display device 102A.

Figure 2B:
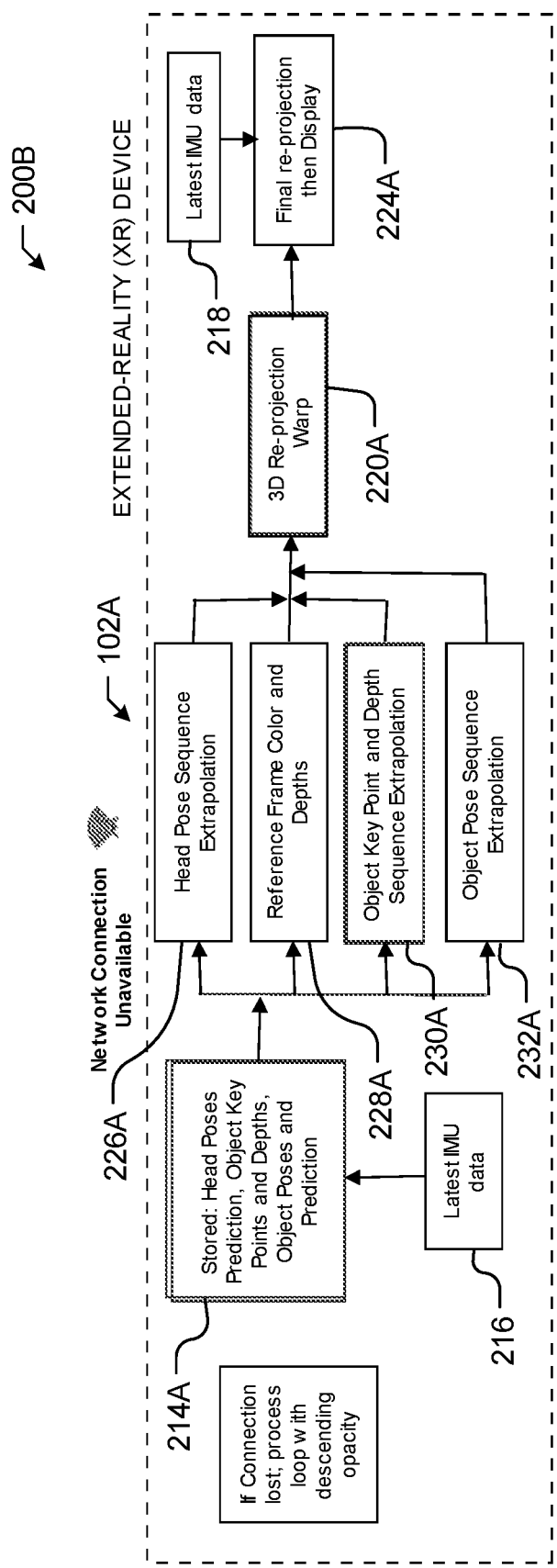
FIG. 2B illustrates a detailed embodiment of an extended reality (XR) device with an unavailable network connection.

FIG. 2B illustrates a detailed embodiment of an extended reality (XR) device with an unavailable network connection for performing a 3D re-projection warping process once a network connection becomes unavailable, in accordance with presently disclosed embodiments. In particular embodiments, once the wireless network connection become temporarily unavailable (e.g., corresponding to the first sequence of image frames no longer being sent from the computing platform 106A to the XR electronic device 102A), the XR electronic device 102A may then access the number of feature points from a depth map corresponding to the first sequence of image frames. For example, prior to detecting the interruption to the image data received from computing platform 106A, the XR electronic device 102A may receive and store the number of feature points corresponding to the first sequence of image frames. In particular embodiments, the feature points may be further processed and curated via the head pose sequence functional block 226A, reference frame color depths functional block 228A, an object key feature point and depth sequence extrapolation functional block 230A, and an object pose sequence extrapolation functional block 232A. In particular embodiments, the XR electronic device 102A may then perform, based on the number of feature points, a 3D re-warping process by the 3D re-projection warping functional block 220A to render, by the final re-projection and display functional block 224A, at least a partial re-rendering of one or more objects included in the first sequence of image frames in accordance with movement and position information (e.g., head pose data, head pose prediction data, object pose data, and object pose prediction data stored at functional block 214A and the latest user IMU data as provided by the to the latest IMU functional block 218). For example, the 3D re-projection warping functional block 220A may utilize the number of feature points to perform image re-projection warping (e.g., transforming the number of feature points into a 3D object or 2.5D object) into at least a partial re-rendering of the one or more objects included in the first sequence of image frames (e.g., along with the latest user head pose data and object pose data). In this way, if a wireless network connection becomes temporarily unavailable, a second sequence of image frames may be rendered for a predetermined period of time thereafter, or until second image data is received again from the computing platform. Thus, the user's XR experience may not cease abruptly, and, instead, may gradually and gracefully cease rendering in the case of network unavailability.

Figure 2C:
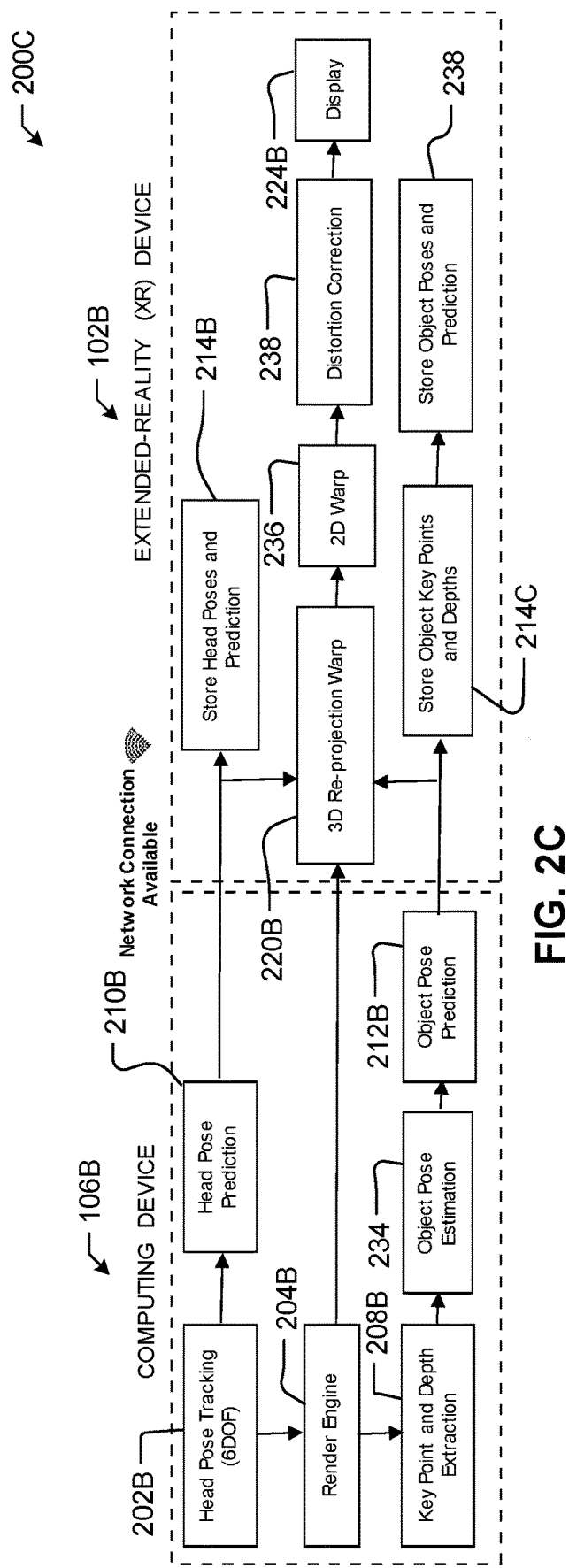
FIG. 2C illustrates another detailed embodiment of an extended reality (XR) system with an unavailable network connection.

FIG. 2C illustrates another detailed embodiment of an extended reality (XR) system 200C for performing a 2D re-projection warping process, in accordance with presently disclosed embodiments. The XR system 200C may differ from the XR system 200A in that the XR electronic device 102B may perform a 2D re-warping via a 2D re-warping function 236A and image distortion correction via the distortion correction functional block 238A. As depicted, the computing platform 106B may include the head pose tracking functional block 202B, the rendering engine 204B, the key feature point and depth extraction functional block 208B, head pose functional block 210B, object pose estimation functional block 234, and the object pose prediction functional block 212B. In particular embodiments, the computing platform 106B may generate image data (e.g., color frames) corresponding to a first sequence of image frames via the rendering engine 204B. The rendering engine 204B may also provide image data (e.g., color frames) to the key feature point and depth extraction functional block 208B. The key feature point and depth extraction functional block 208B may then provide key feature point and depth extraction data to the object pose estimation functional block 234. The object pose estimation functional block 234 may be provided to estimate object poses from the key feature point and depth extraction data. The object pose prediction functional block 212B may then receive the estimated object poses and generate object pose prediction data based thereon.

As further depicted, when the wireless network connection is available, the computing platform 106B may store the number of feature points and the object pose prediction data to the object key feature points and depth map data storage functional block 214C of the XR electronic device 102B. Similarly, the computing platform 106B may store head pose data and head pose prediction data to the storage functional block 214B of the XR electronic device 102B. As further depicted, while the wireless network connection remains available, the number of feature points and the head pose prediction data and the object pose prediction data, as well as the image data (e.g., color frames) from the rendering engine 204B may all be provided to the 3D re-projection warping functional block 220B. In particular embodiments, the 3D re-projection warping functional block 220B may then provide output rendering data to the 2D warping functional block 236A. Following a 2D warping of the rending data and distortion correction 238A (e.g., correction of color distortion), the color frames corresponding to a first sequence of image frames may be provided to the display 224B for rendering to a user.

Figure 2D:
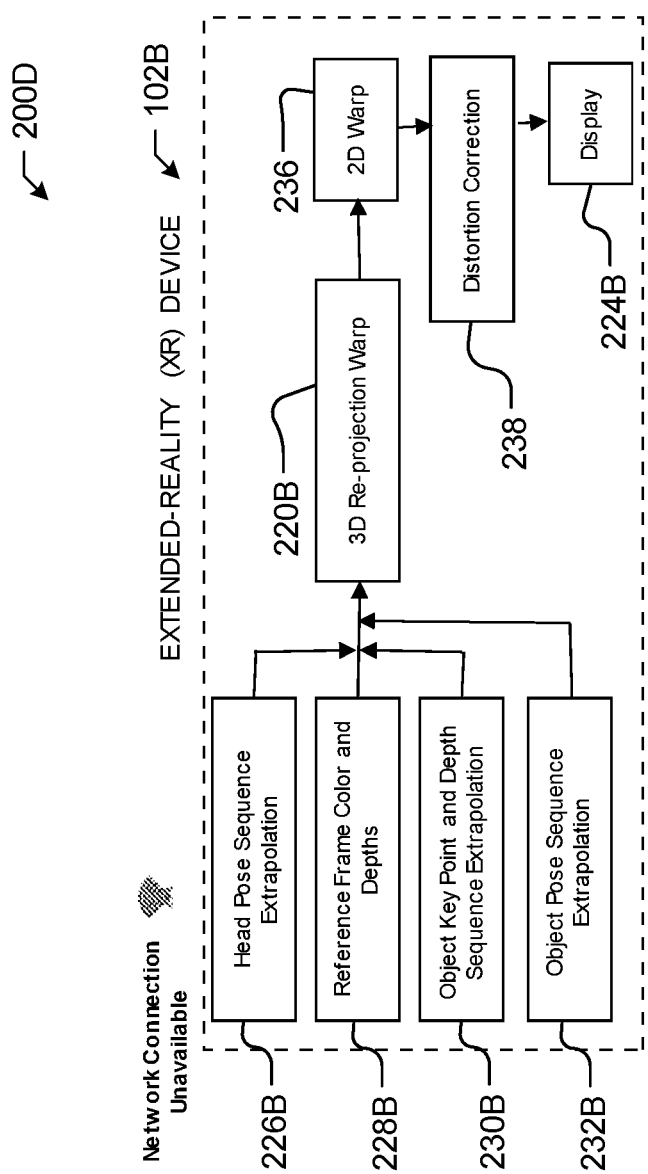
FIG. 2D illustrates another detailed embodiment of an extended reality (XR) device with an unavailable network connection.

FIG. 2D illustrates another detailed embodiment of an extended reality (XR) system 200D for performing a 2D re-projection warping process with an unavailable network connection, in accordance with presently disclosed embodiments. For example, when the wireless network connection becomes unavailable, the XR electronic device 102B may receive head pose sequence data from the head pose extrapolation functional block 226B, reference frame color and depth data from the reference frame color and depth functional block 228B, key feature point and depth sequence data from the key feature point and depth functional block 230B, and object pose sequence data from the object pose extrapolation functional block 232B. As further depicted, while the wireless network connection remains unavailable, the head pose sequence data, the reference frame color and depth data, the key feature point and depth sequence data, and the object pose sequence data may all be provided to the 3D re-projection warping functional block 220B. In particular embodiments, the 3D re-projection warping functional block 220B may then provide output rendering data to the 2D warping functional block 236B. Following a 2D warping of the rending data and distortion correction 238 (e.g., correction of color distortion), the color frames corresponding to a second sequence of image frames may be provided to the display 224B for rendering to a user. In this way, if a wireless network connection becomes temporarily unavailable, a second sequence of image frames may be rendered for a predetermined period of time thereafter, or until second image data is received again from the computing platform. Thus, the user's XR experience may not cease abruptly, and, instead, may gradually and gracefully cease rendering in the case of network unavailability.

Figure 3:
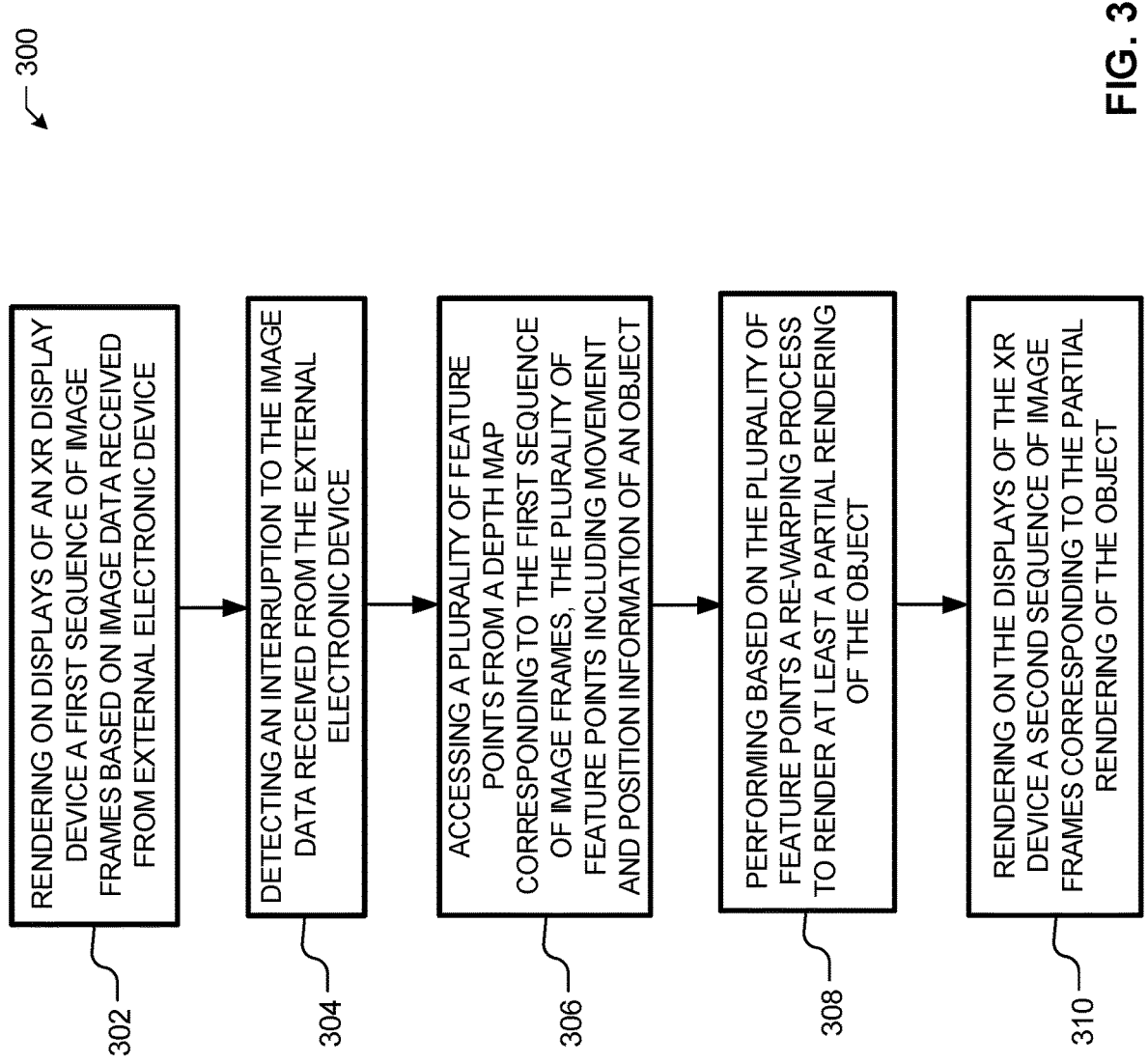
FIG. 3 illustrates is a flow diagram of a method for re-projecting depth maps on user electronic devices.

FIG. 3 illustrates is a flow diagram of a method 300 for re-projecting depth maps on user electronic devices. The method 300 may be performed utilizing one or more processing devices (e.g., XR electronic device 102) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

The method 300 may begin block 302 with the one or more processing devices (e.g., XR electronic device 102) rendering, on one or more displays of an XR electronic device, a first sequence of image frames based on image data received from an external electronic device associated with the XR electronic device. The method 300 may then continue at block 304 with the one or more processing devices (e.g., XR electronic device 102) detecting an interruption to the image data received from the external electronic device associated with the XR display device. In particular embodiments, the XR electronic device and the external electronic device may be communicatively connected to each other via a wireless connection, in which the interruption is an interruption to the wireless connection. The method 300 may then continue at block 306 with the one or more processing devices (e.g., XR electronic device 102) accessing a number of feature points from a depth map corresponding to the first sequence of image frames, in which the number of feature points includes movement and position information of one or more objects within the first sequence of image frames.

In particular embodiments, prior to detecting the interruption to the image data received from the external electronic device, the XR electronic device may receive the number of feature points corresponding to the first sequence of image frames from the external electronic device as a background process. In particular embodiments, the XR electronic device may then store, to a memory of the XR electronic device, the number of feature points corresponding to the first sequence of image frames. The method 300 may then continue at block 308 with the one or more processing devices (e.g., XR electronic device 102) performing a re-warping to at least partially re-render the one or more objects based at least in part on the plurality of feature points and spatiotemporal data. In particular embodiments, the XR electronic device may access current head pose data and predicted head pose data, in which the current head pose data and the predicted head pose data may be associated with the number of feature points. In particular embodiments, the XR electronic device may also access current object pose data and predicted object pose data, in which the current object pose data and the predicted object pose data may be associated with the number of feature points.

In particular embodiments, the XR electronic device may perform the re-warping process by determining one or more current color frames corresponding to the first sequence of image frames, and generating, based on the one or more current color frames, one or more updated color frames corresponding to the first sequence of image frames. The method 300 may then conclude at block 310 with the one or more processing devices (e.g., XR electronic device 102) rendering, on the one or more displays of the XR electronic device, a second sequence of image frames corresponding to the partial re-rendering of the one or more objects. In this way, if a wireless network connection becomes temporarily unavailable, the second sequence of image frames may be rendered for a predetermined period of time thereafter, or until second image data is received again from the computing platform. Thus, the user's XR experience may not cease abruptly, and, instead, may gradually and gracefully cease rendering in the case of network unavailability.

Figure 4:
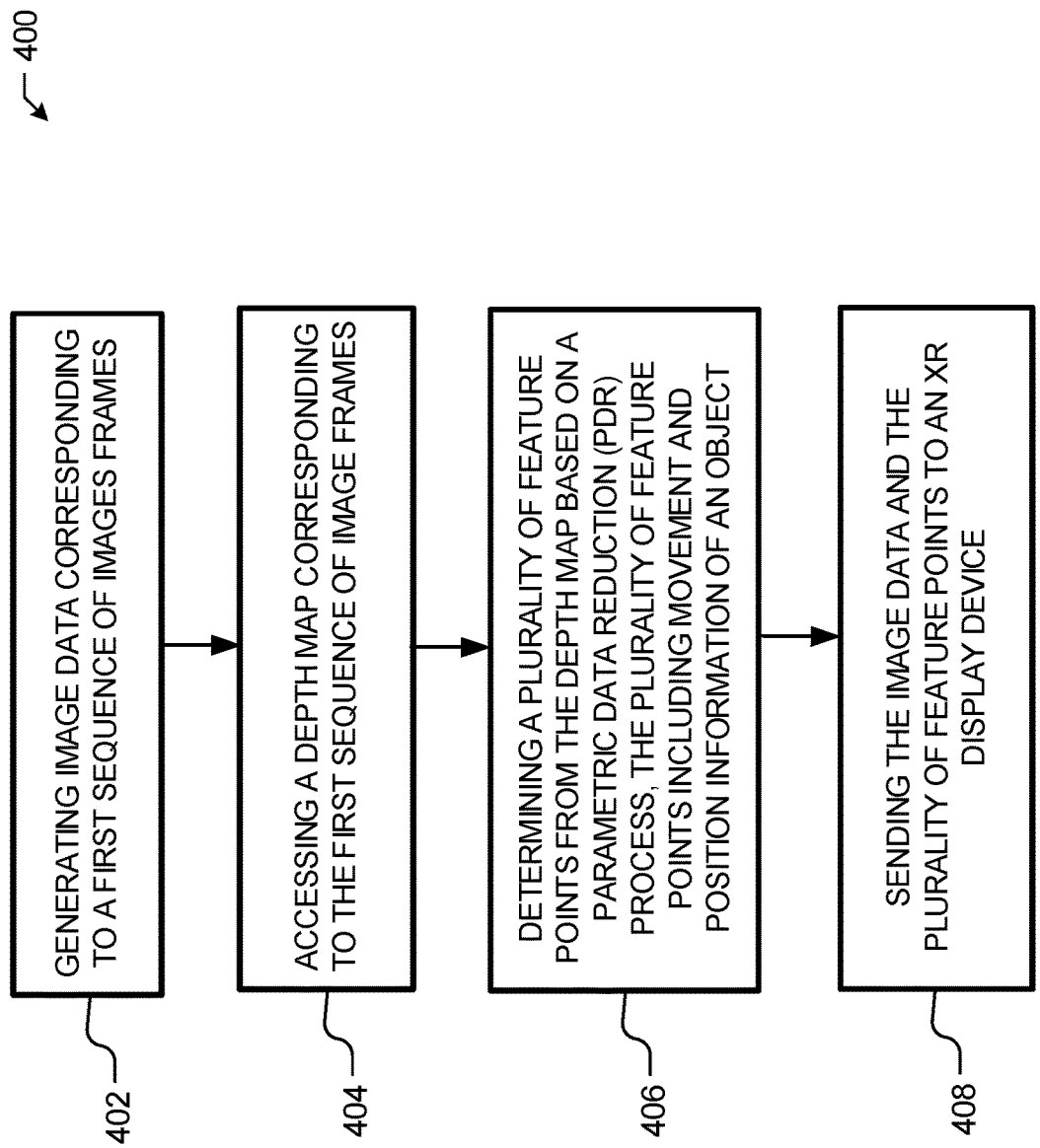
FIG. 4 illustrates is a flow diagram of a method for providing depth map feature points for re-projecting depth maps on user electronic devices.

FIG. 4 illustrates is a flow diagram of a method 400 for providing depth map feature points for re-projecting depth maps on user electronic devices, in accordance with the presently disclosed embodiments. The method 400 may be performed utilizing one or more processing devices (e.g., computing platform 106) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

The method 400 may begin block 402 with the one or more processing devices (e.g., computing platform 106) generating image data corresponding to a first sequence of image frames. The method 400 may then continue at block 404 with the one or more processing devices (e.g., computing platform 106) accessing a depth map corresponding to the first sequence of image frames. In particular embodiments, the depth map may include depth information for one or more most recent image frames of the first sequence of image frames. The method 400 may then continue at block 406 with the one or more processing devices (e.g., computing platform 106) determining a number of feature points from the depth map corresponding to the first sequence of image frames based at least in part on a parametric data reduction (PDR) process, in which the number of feature points includes movement and position information of one or more objects within the first sequence of image frames.

In particular embodiments, the computing platform may determine the number of feature points from the depth map may by selecting a subset of feature points of a total set of feature points included in the depth map. In particular embodiments, the computing platform may also determine the number of feature points from the depth map by determining a plurality of feature points within a predetermined viewing area. In particular embodiments, the computing platform may determine the number of feature points within the predetermined viewing area by determining a number of feature points within a predefined fovea display area. In particular embodiments, the number of feature points within the predefined fovea display area may include a grouping of feature points based at least part on a nearest-neighbor interpolation. In particular embodiments, the grouping of feature points may include a subgrouping of feature points grouped based at least part on a depth calculation. In particular embodiments, the computing platform may determine the number of feature points by determining a pixel region corresponding to the one or more objects within the first sequence of image frames, and dividing the pixel region corresponding to the one or more objects into N pixel subregions. In particular embodiments, the computing platform may then extract a number of feature points from the N pixel subregions, in which each of the number of feature points is extracted from a respective one of the N pixel subregions based on a confidence threshold. In particular embodiments, the computing platform may determine a position and an optical flow for each of the plurality of feature points.

The method 400 may then conclude at block 408 with the one or more processing devices (e.g., computing platform 106) sending the image data and the number of feature points to an XR electronic device that is external to the electronic device. In particular embodiments, the computing platform and the XR display device may be communicatively connected to each other via a wireless connection. In particular embodiments, the computing platform may also provide current head pose data and predicted head pose data to the XR electronic device, in which the current head pose data and the predicted head pose data may be associated with the number of feature points. In particular embodiment, the computing platform may also provide current object pose data and predicted object pose data to the XR electronic device, in which the current object pose data and the predicted object pose data are associated with the number of feature points. In this way, if a wireless network connection becomes temporarily unavailable, the second sequence of image frames may be rendered for a predetermined period of time thereafter, or until second image data is received again from the computing platform. Thus, the user's XR experience may not cease abruptly, and, instead, may gradually and gracefully cease rendering in the case of network unavailability.

FIGS. 5A and 5B illustrate workflow diagram 500A for determining one or more current color frames and a frame extrapolation diagram 500B for determining a number of image frames to be extrapolated, respectively, in accordance with the presently disclosed embodiments. In particular embodiments, the workflow diagram 500A may be performed, for example, by the XR electronic device 102. As depicted, the workflow diagram 500A may commence at block 502 with the XR electronic device 102 obtaining predicted head poses and object poses. For example, in particular embodiments, the XR electronic device 102 may access current head pose data, predicted head pose data, current object pose data, and predicted object pose data that may be associated with the number of feature points received from the computing platform 106. In particular embodiments, the workflow diagram 500A may then continue at block 504 with the XR electronic device 102 re-projecting the current color image frames. As one example, in particular embodiments, the re-projection of the current color image frames may be expressed as vectors $u_2$ and $v_2$, as set forth below:

$$u_2 = \frac{w_{11} + w_{12}u_1 + w_{13}v_1 + w_{14}\delta(u_1, v_1)}{w_{31} + w_{32}u_1 + w_{33}v_1 + w_{34}\delta(u_1, v_1)}, \quad \text{(Equation 1)}$$

$$v_2 = \frac{w_{21} + w_{22}u_1 + w_{23}v_1 + w_{24}\delta(u_1, v_1)}{w_{31} + w_{32}u_1 + w_{33}v_1 + w_{34}\delta(u_1, v_1)}. \quad \text{(Equation 2)}$$

In particular embodiments, the workflow diagram 500A may then conclude at block 506 with the XR electronic device 102 obtaining updated color image frames. For example, in particular embodiments, the XR electronic device 102 may, for example, update a current frame by the 3D re-projection warping functional block 220 (e.g., 3D re-projection warping process) to create a new color frame, which may be utilized, for example, during one or more delays between head poses and/or object poses or changes thereto. In particular embodiments, the new color frame may be correlated with changes to head poses and/or object poses based on, for example, a 2D rotation and translation.

In particular embodiments, when the wireless network becomes temporarily unavailable, the XR electronic device 102 may utilize the 3D re-projection warping functional block 220 (e.g., 3D re-projection warping process) to create new image frame sequence based on, for example, the number of feature points corresponding to the first sequence of image frames and received from the computing platform 106, and the current head pose data, predicted head pose data, current object pose data, and predicted object pose data that may be associated with the number of feature points received from the computing platform 106. FIG. 5B illustrates a manner in which a sequence of image frames 508, 510, 512, 514, and 516 (e.g., color image frames) may be extrapolated based on, for example, one or more of the most recent image frames of the sequence of image frames 508, 510, 512, 514, and 516, as well indicating the determined number of image frames to be extrapolated based on, for example, the most recent 3 image frames for 3D extrapolation and the most recent 2 image frames for 2D extrapolation to perform gradual and graceful ceasing of image rendering in the case of network unavailability. Specifically, in particular embodiments, the 3 most recent image frames of the sequence of image frames 508, 510, 512, 514, and 516 may be extrapolated for rendering 3D image frames (e.g., depth maps), and the 2 most recent image frames of the sequence of image frames 508, 510, 512, 514, and 516 may be extrapolated for rendering 2D image frames. In particular embodiments, the number of most recent image frames of the sequence of image frames 508, 510, 512, 514, and 516 may also depend on, for example, factors including frame frequency and duration, scene complexity, distances between objects, and so forth.

Figure 6A:
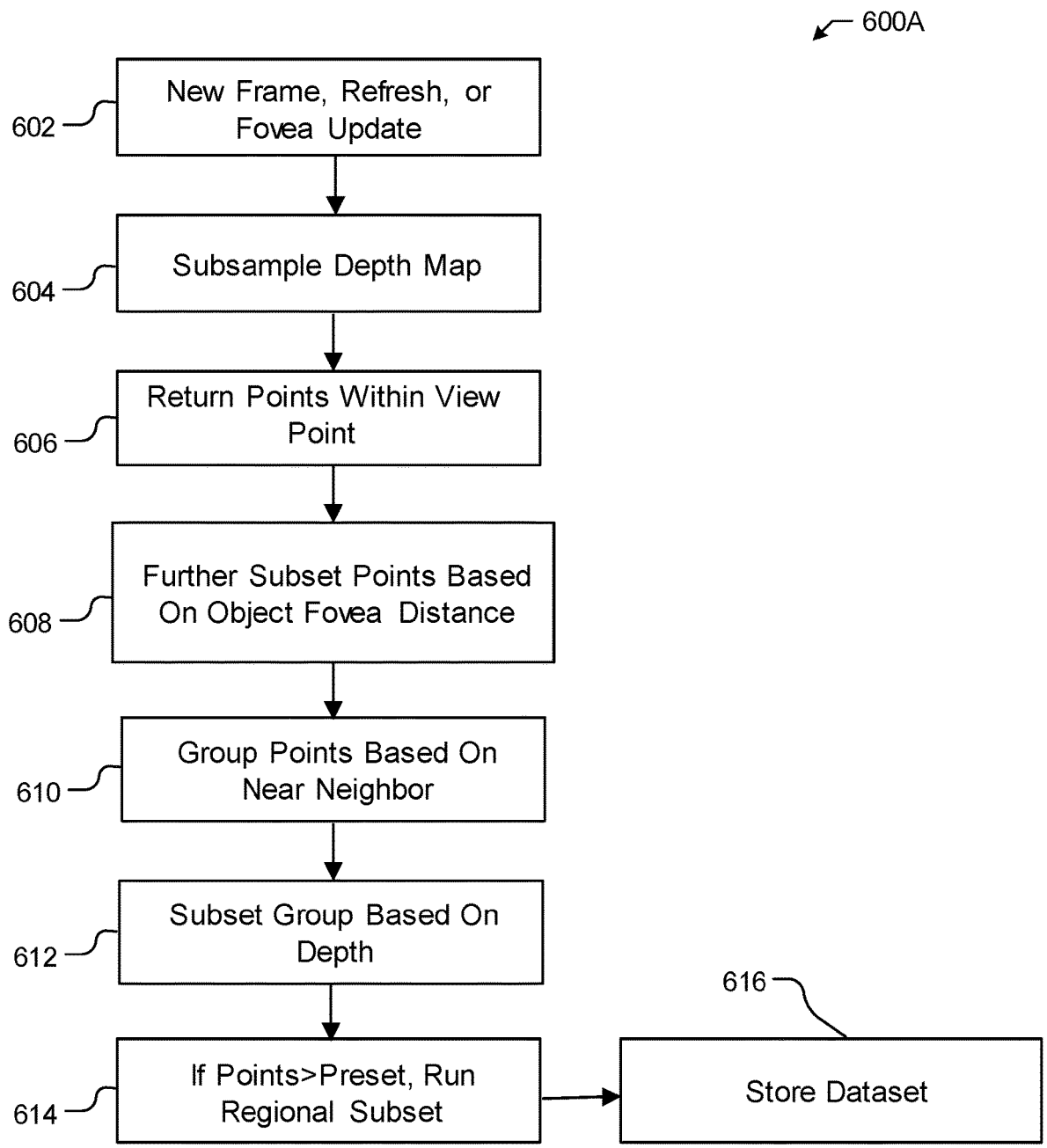
FIGS. 6A, 6B, and 6C illustrate a workflow diagram for reducing feature points a workflow diagram for determining feature points, and a workflow diagram for determining key point and depth sequence extrapolation, respectively.
Figure 6B:
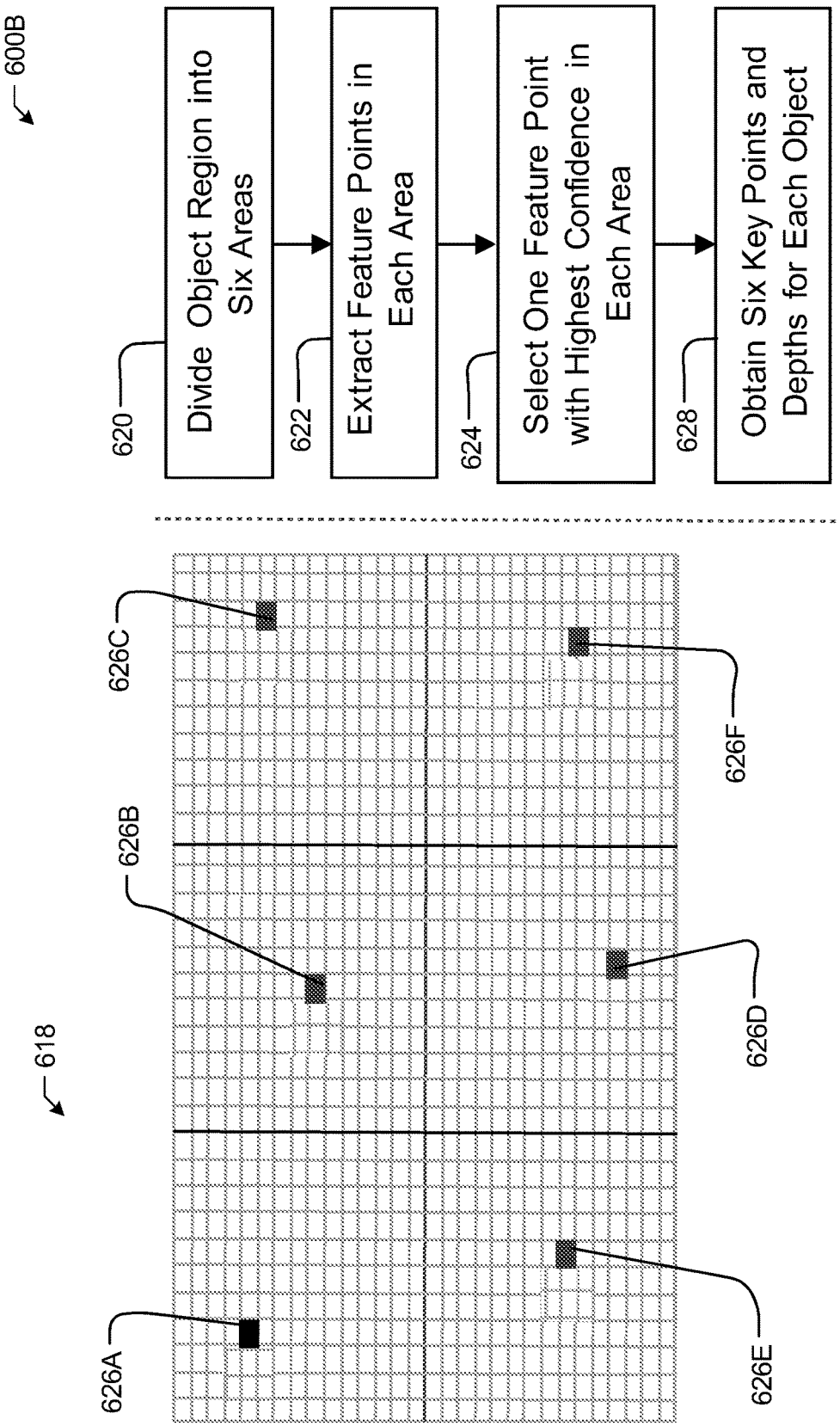
Figure 6C:
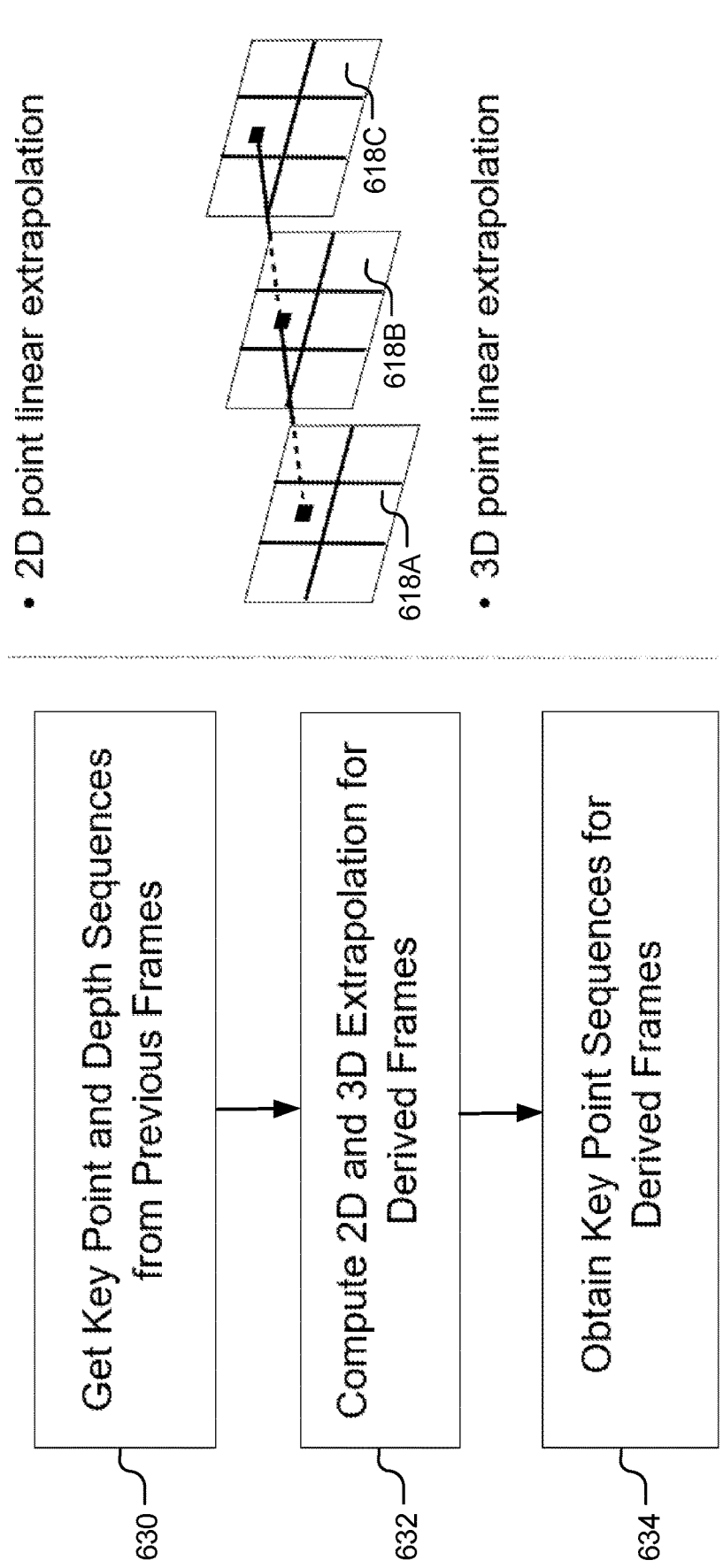

FIGS. 6A, 6B, and 6C illustrate a workflow diagram 600A for selecting key feature points based on a parametric data reduction (PDR) process, a workflow diagram 600B for determining and reducing feature points, and a workflow diagram 600C for determining key point and depth sequence extrapolation, respectively, in accordance with the presently disclosed embodiments. In particular embodiments, the workflow diagrams 600A, 600B, and 600C may each be performed, for example, by the key feature point and depth extraction functional block 208A, 208B of the computing platform 106A, 106B. In particular embodiments, the workflow diagram 600A may be provided to reduce feature points selected from a number of frames. In particular embodiments, the workflow diagram 600A may commence at block 602 with the computing platform 106 determining a new image frame, a display refresh, or fovea image update. The workflow diagram 600A may then at block 604 with the computing platform 106 subsampling the depth map corresponding the first sequence of images. The workflow diagram 600A may then continue at block 606 with the computing platform 106 identifying feature points within a predetermined viewing area. The workflow diagram 600A may then continue at block 608 with the computing platform 106 reducing the feature points within the viewing area based on a predefined fovea display area. The workflow diagram 600A may then continue at block 610 with the computing platform 106 grouping the feature points based on a on a nearest-neighbor interpolation. The workflow diagram 600A may then continue at block 612 with the computing platform 106 grouping the feature points based on a depth calculation. The workflow diagram 600A may then continue at block 614 with the computing platform 106 running a pixel regional subset if the reduced feature points are determined to be greater than, for example, a predetermined preset value. The workflow diagram 600A may then conclude at block 616 with the computing platform 106 storing the reduced dataset of feature points (e.g., to be provided to the XR electronic device 102).

In particular embodiments, the workflow diagram 600B may be provided to determine feature points selected from a number of frames 618. For example, the workflow diagram 600B may be provided to determine one or more pixel regions corresponding to one or more objects within, for example, the first sequence of image frames being provided to the XR electronic device 102 for rendering while the wireless network connection is available. The workflow diagram 600B may commence at block 620 with the computing platform 106A, 106B dividing the one or more pixel regions corresponding to the one or more objects into N pixel subregions (e.g., 6 pixel subregions as illustrated in FIG. 6B). The workflow diagram 600B may then continue at block 622 with the computing platform 106A, 106B extracting a number of feature points 626A, 626B, 626C, 626D, 626E, and 626F from the N pixel subregions, in which each of the number of feature points 626A, 626B, 626C, 626D, 626E, and 626F may be extracted from a respective one of the N pixel subregions based on a confidence threshold. The workflow diagram 600B may then continue at block 624 with the computing platform 106A, 106B selecting the number of feature points 626A, 626B, 626C, 626D, 626E, and 626F from the N pixel subregions corresponding to the confidence threshold for each of the N pixel subregions. In an example embodiment, the number of feature points 626A, 626B, 626C, 626D, 626E, and 626F may be expressed in 3D space as:

$$P = \left[x, y, z, \frac{\delta x}{\delta t}, \frac{\delta y}{\delta t}, \frac{\delta z}{\delta t}\right]\{P_0, P_1, P_2, P_3, P_4, P_5\}. \quad \text{(Equation 3)}$$

The workflow diagram 600B may then conclude at block 628 with the computing platform 106A, 106B determining a position and an optical flow for each of the number of feature points 626A, 626B, 626C, 626D, 626E, and 626F. The workflow diagram 600C may commence at block 630 with the computing platform 106A, 106B getting key point differences from previous frames. The workflow diagram 600C may continue at block 632 with the computing platform 106A, 106B computing 2D and 3D extrapolation for derived frames. In an example embodiment, the 2D extrapolation of derived frames may be expressed as:

$$y = y_1 + \frac{x - x_1}{x_2 - x_1}(y_2 - y_1). \quad \text{(Equation 4)}$$

In an example embodiment, the 3D extrapolation of derived frames may be expressed as:

$$x_4 = x_1 + A(x_2 - x_1) + B(x_3 - x_1)$$

$$y_4 = y_1 + A(y_2 - y_1) + B(y_3 - y_1)$$

$$z_4 = z_1 + A(z_2 - z_1) + B(z_3 - z_1) \quad \text{Equation (5).}$$

The workflow diagram 600C may conclude at block 634 with the computing platform 106A, 106B obtaining key point sequences for derived frames.

FIGS. 7A, 7B, and 7C illustrate a workflow diagrams 700A, 700B, and 700C for determining and estimating head poses and object poses in the most recent image frames and/or derived image frames, respectively, in accordance with the presently disclosed embodiments. In particular embodiments, the workflow diagram 700A may be performed, for example, by the head pose sequence functional block 226A, 226B of the XR electronic device 102A, 102B. In particular embodiments, the workflow diagram 700A may commence at block 702 with the XR electronic device 102A, 102B obtaining stored head poses of previous two frames. The workflow diagram 700A may continue at block 704 with the XR electronic device 102A, 102B extrapolating 3D head pose sequence for derived image frames. The workflow diagram 700A may continue at block 706 with the XR electronic device 102A, 102B obtaining head poses sequence for derived image frames.

In particular embodiments, the workflow diagram 700B may be performed, for example, by the object pose prediction functional block 212A, 212B of the computing platform 106A, 106B. In particular embodiments, the workflow diagram 700B may commence at block 708 with the computing platform 106 obtaining estimated object poses of previous two frames. The workflow diagram 700A may continue at block 710 with the computing platform 106A, 106B extrapolating poses of all of objects in the next frame. The workflow diagram 700A may continue at block 712 with the computing platform 106A, 106B obtaining 3D poses of all objects in the next frame. In particular embodiments, the workflow diagram 700C may be performed, for example, by the object pose sequence extrapolation functional block 232A, 232B of the XR electronic device 102A, 102B. In particular embodiments, the workflow diagram 700C may commence at block 714 with the XR electronic device 102A, 102B obtaining key feature points sequences of derived image frames. The workflow diagram 700C may continue at block 716 with the XR electronic device 102A, 102B estimating poses for each object in each derived image frame. The workflow diagram 700A may continue at block 718 with the XR electronic device 102A, 102B obtaining object poses sequences of all derived image frames.

Figures 7D, 7E:
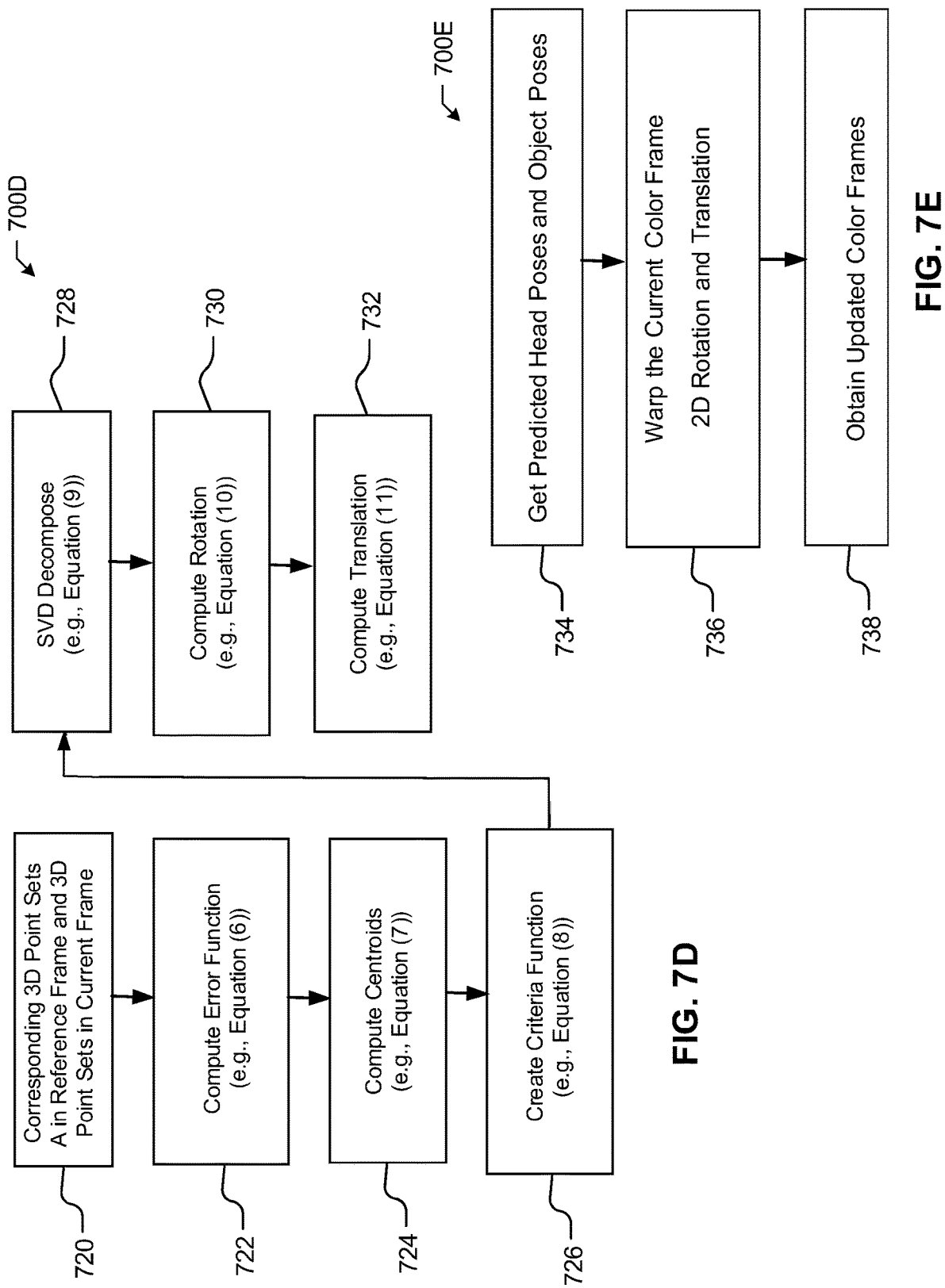
FIGS. 7D and 7E illustrate workflow diagrams and for determining object pose estimation and performing a 2D image warping and re-projection, respectively.

FIGS. 7D and 7E illustrate a workflow diagrams 700D and 700E for determining object pose estimation and performing a 2D image warping and re-projection, respectively, in accordance with the presently disclosed embodiments. In particular embodiments, the workflow diagram 700D may be performed, for example, by the object pose estimation functional block 234 of the computing platform 106B. In particular embodiments, the workflow diagram 700D may commence at block 720 with the computing platform 106B determining corresponding 3D feature point sets A in a reference image frame and 3D feature point sets B in a current image frame. The workflow diagram 700D may continue at block 722 with the computing platform 106B computing an error function with respect to the current frame and the reference image frame. In an example embodiment, the error function may be expressed as:

$$RA + t = B \quad \text{(Equation 6)}$$

$$err = \sum_{i=1}^{N} \|RA^i + t - B\|^2.$$

In the Equation (6), R may represent rotation, in particular embodiments. The workflow diagram 700D may continue at block 724 with the computing platform 106B computing one or more centroid values with respect to 3D feature point sets A in the reference image frame and 3D feature point sets B in the current image frame. In an example embodiment, the one or more centroid values may be expressed as:

$$\text{centroid}_A = \frac{1}{N}\sum_{i=1}^{N} A^i, \quad \text{centroid}_B = \frac{1}{N}\sum_{i=1}^{N} B^i. \quad \text{(Equation 7)}$$

The workflow diagram 700D may continue at block 726 with the computing platform 106B creating a criterion function based on the one or more centroid values. In an example embodiment, the criterion function H may be expressed as:

$$H = (A - \text{centroid}_A)(B - \text{centroid}_B)^T \quad \text{Equation (8)}.$$

The workflow diagram 700D may continue at block 728 with the computing platform 106B performing a singular value decomposition (SVD) with respect to the reference frame and the current image frame. In an example embodiment, the criterion function may be expressed as:

$$[U,S,V] = \text{SVD}(H) \quad \text{Equation (9)}.$$

In the Equation (9), U, S, and V may each represent, for example, a factorized matrix. The workflow diagram 700D may continue at block 730 with the computing platform 106B computing a rotation matrix based on the SVD decomposition. In an example embodiment, the rotation matrix R may be expressed as:

$$R = VU^T \quad \text{Equation (10)}.$$

In the Equation (10), each of the factorized matrices U and V may be transformed by a transformation matrix T The workflow diagram 700D may then conclude at block 732 with the computing platform 106B computing a translation matrix based on the rotation of the SVD decomposition. In an example embodiment, the translation matrix may be expressed as:

$$RA + t = B$$

$$R \cdot \text{centroid}_A + t = \text{centroid}_B$$

$$t = \text{centroid}_B - R \cdot \text{centroid}_A \quad \text{Equation (11)}.$$

In particular embodiments, the workflow diagram 700E may be performed, for example, by the 2D re-warping function 236A, 236B of the XR electronic device 102A, 102B. In particular embodiments, the workflow diagram 700E may commence at block 734 with the XR electronic device 102A, 102B obtaining predicted head poses and object poses. The workflow diagram 700E may continue at block 736 with the XR electronic device 102A, 102B warping a current color image frame utilizing 2D rotation and translation. The workflow diagram 700E may then conclude at block 738 with the XR electronic device 102A, 102B obtaining updated color image frames.

Figure 8:
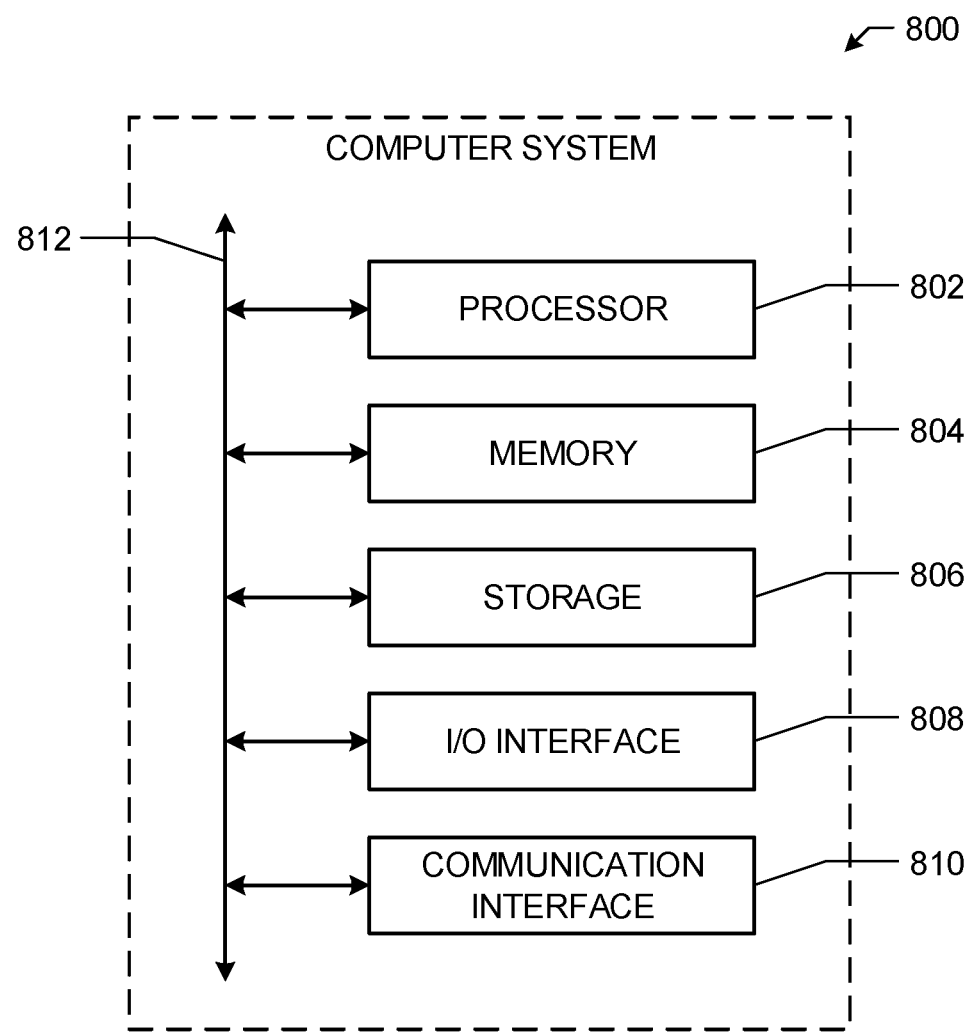
FIG. 8 illustrates an example computer system.

FIG. 8 illustrates an example computer system 800 that may be utilized for re-projecting depth maps on user electronic devices, in accordance with the presently disclosed embodiments. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks.

Where appropriate, one or more computer systems 800 may perform without substantial spatial or temporal limitation one or more steps of one or more methods described or illustrated herein. As an example, and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example, and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example, and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example, and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere).

One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example, and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 806 for them. Where appropriate, I/O interface 808 may include one or more device or software drivers enabling processor 802 to drive one or more of these I/O devices. I/O interface 808 may include one or more I/O interfaces 806, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it.

As an example, and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example, and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, may be claimed in another claim category, e.g. system, as well. The dependencies or references back in the attached claims are chosen for formal reasons only. However, any subject matter resulting from a deliberate reference back to any previous claims (in particular multiple dependencies) may be claimed as well, so that any combination of claims and the features thereof are disclosed and may be claimed regardless of the dependencies chosen in the attached claims. The subject-matter which may be claimed comprises not only the combinations of features as set out in the attached claims but also any other combination of features in the claims, wherein each feature mentioned in the claims may be combined with any other feature or combination of other features in the claims. Furthermore, any of the embodiments and features described or depicted herein may be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an extended reality (XR) display device:
   rendering, on one or more displays of the XR display device, a first sequence of image frames based on image data received from an external electronic device associated with the XR display device;
   detecting an interruption to the image data received from the external electronic device associated with the XR display device;
   accessing a plurality of feature points from a depth map corresponding to the first sequence of image frames, wherein the plurality of feature points comprises movement and position information of one or more objects within the first sequence of image frames;
   performing a re-warping to at least partially re-render the one or more objects based at least in part on the plurality of feature points and spatiotemporal data; and
   rendering, on the one or more displays of the XR display device, a second sequence of image frames corresponding to the partial re-rendering of the one or more objects.

2. The method of claim 1, wherein the spatiotemporal data comprises one or more of:
   current head pose data and predicted head pose data; or
   current object pose data and predicted object pose data.

3. The method of claim 1, wherein performing the re-warping comprises:
   determining one or more current color frames corresponding at least partially to the first sequence of image frames; and
   generating, based on the one or more current color frames, one or more updated color frames corresponding at least partially to the first sequence of image frames.

4. The method of claim 1, further comprising:
   prior to detecting the interruption to the image data received from the external electronic device:
      receiving the plurality of feature points corresponding to the first sequence of image frames from the external electronic device as a background process; and
      storing, to a memory of the XR display device, the plurality of feature points corresponding to the first sequence of image frames.

5. The method of claim 1, wherein the second sequence of image frames is rendered:
   for a predetermined period of time; or
   until second image data is received from the external electronic device.

6. An extended reality (XR) display device comprising:
   a transceiver;
   one or more displays;
   one or more non-transitory computer-readable storage media including instructions; and
   one or more processors coupled to the storage media, the one or more processors configured to execute the instructions to:
      render, on one or more displays of the XR display device, a first sequence of image frames based on image data received from an external electronic device associated with the XR display device;
      detect an interruption to the image data received from the external electronic device associated with the XR display device;
      access a plurality of feature points from a depth map corresponding to the first sequence of image frames, wherein the plurality of feature points comprises movement and position information of one or more objects within the first sequence of image frames;
      perform a re-warping to at least partially re-render the one or more objects based at least in part on the plurality of feature points and spatiotemporal data; and
      render, on the one or more displays of the XR display device, a second sequence of image frames corresponding to the partial re-rendering of the one or more objects.

7. The XR display device of claim 6, wherein the spatiotemporal data comprises one or more of:
   current head pose data and predicted head pose data; or
   current object pose data and predicted object pose data.

8. The XR display device of claim 6, wherein the instructions to perform the re-warping further comprise instructions to:
   determine one or more current color frames corresponding at least partially to the first sequence of image frames; and
   generate, based on the one or more current color frames, one or more updated color frames corresponding at least partially to the first sequence of image frames.

9. The XR display device of claim 6, the one or more processors are further configured to execute the instructions to:
   prior to detecting the interruption to the image data received from the external electronic device:
      receive the plurality of feature points corresponding to the first sequence of image frames from the external electronic device as a background process; and
      store, to a memory of the XR display device, the plurality of feature points corresponding to the first sequence of image frames.

10. The XR display device of claim 6, wherein the second sequence of image frames is rendered:
for a predetermined period of time; or
until second image data is received from the external electronic device.

11. A non-transitory computer-readable medium comprising instructions that, when executed by one or more processors of an extended reality (XR) display device, cause the one or more processors to:
render, on one or more displays of the XR display device, a first sequence of image frames based on image data received from an external electronic device associated with the XR display device;
detect an interruption to the image data received from the external electronic device associated with the XR display device;
access a plurality of feature points from a depth map corresponding to the first sequence of image frames, wherein the plurality of feature points comprises movement and position information of one or more objects within the first sequence of image frames;
perform a re-warping to at least partially re-render the one or more objects based at least in part on the plurality of feature points and spatiotemporal data; and
render, on the one or more displays of the XR display device, a second sequence of image frames corresponding to the partial re-rendering of the one or more objects.

12. The non-transitory computer-readable medium of claim 11, wherein the spatiotemporal data comprises one or more of:
current head pose data and predicted head pose data; or
current object pose data and predicted object pose data.

13. The non-transitory computer-readable medium of claim 11, wherein the instructions to perform the re-warping further comprise instructions to:
determine one or more current color frames corresponding at least partially to the first sequence of image frames; and
generate, based on the one or more current color frames, one or more updated color frames corresponding at least partially to the first sequence of image frames.

14. The non-transitory computer-readable medium of claim 11, further comprising instructions that, when executed by the one or more processors of XR display device, cause the one or more processors to:
prior to detecting the interruption to the image data received from the external electronic device:
receive the plurality of feature points corresponding to the first sequence of image frames from the external electronic device as a background process; and
store, to a memory of the XR display device, the plurality of feature points corresponding to the first sequence of image frames.

15. The non-transitory computer-readable medium of claim 11, wherein the second sequence of image frames is rendered:
for a predetermined period of time; or
until second image data is received from the external electronic device.

16. A method comprising, by an electronic device:
generating image data corresponding to a first sequence of image frames;
accessing a depth map corresponding to the first sequence of image frames;
determining a plurality of feature points from the depth map corresponding to the first sequence of image frames based at least in part on parametric data reduction (PDR), wherein the plurality of feature points comprises movement and position information of one or more objects within the first sequence of image frames; and
sending the image data and the plurality of feature points to an extended reality (XR) display device that is external to the electronic device.

17. The method of claim 16, wherein the depth map comprises depth information for one or more most recent image frames of the first sequence of image frames.

18. The method of claim 16, wherein determining the plurality of feature points from the depth map comprises selecting a subset of feature points of a total set of feature points included in the depth map.

19. The method of claim 16, wherein determining the plurality of feature points from the depth map comprises determining a plurality of feature points within a predetermined viewing area.

20. The method of claim 19, wherein determining the plurality of feature points within the predetermined viewing area comprises determining a plurality of feature points within a predefined fovea display area, wherein the plurality of feature points within the predefined fovea display area comprises a grouping of feature points based at least part on a nearest-neighbor interpolation, and wherein the grouping of feature points comprises a subgrouping of feature points grouped based at least part on a depth calculation.

21. An electronic device comprising:
a transceiver;
one or more non-transitory computer-readable storage media including instructions; and
one or more processors coupled to the storage media, the one or more processors configured to execute the instructions to:
generate image data corresponding to a first sequence of image frames;
access a depth map corresponding to the first sequence of image frames;
determine a plurality of feature points from the depth map corresponding to the first sequence of image frames based at least in part on parametric data reduction (PDR), wherein the plurality of feature points comprises movement and position information of one or more objects within the first sequence of image frames; and
send the image data and the plurality of feature points to an extended reality (XR) display device that is external to the electronic device.

22. The electronic device of claim 21, wherein the depth map comprises depth information for one or more most recent image frames of the first sequence of image frames.

23. The electronic device of claim 21, wherein determining the plurality of feature points from the depth map comprises selecting a subset of feature points of a total set of feature points included in the depth map.

24. The electronic device of claim 21, wherein determining the plurality of feature points from the depth map comprises determining a plurality of feature points within a predetermined viewing area.

25. The electronic device of claim 24, wherein the instruction to determine the plurality of feature points within the predetermined viewing area further comprise instruction to determine a plurality of feature points within a predefined fovea display area, wherein the plurality of feature points within the predefined fovea display area comprises a grouping of feature points based at least part on a nearest-neighbor interpolation, and wherein the grouping of feature points comprises a subgrouping of feature points grouped based at least part on a depth calculation.

26. A non-transitory computer-readable medium comprising instructions that, when executed by one or more processors of an electronic device, cause the one or more processors to:

generate image data corresponding to a first sequence of image frames;

access a depth map corresponding to the first sequence of image frames;

determine a plurality of feature points from the depth map corresponding to the first sequence of image frames based at least in part on parametric data reduction (PDR), wherein the plurality of feature points comprises movement and position information of one or more objects within the first sequence of image frames; and send the image data and the plurality of feature points to an extended reality (XR) display device that is external to the electronic device.

27. The non-transitory computer-readable medium of claim 26, wherein the depth map comprises depth information for one or more most recent image frames of the first sequence of image frames.

28. The non-transitory computer-readable medium of claim 26, wherein determining the plurality of feature points from the depth map comprises selecting a subset of feature points of a total set of feature points included in the depth map.

29. The non-transitory computer-readable medium of claim 26, wherein determining the plurality of feature points from the depth map comprises determining a plurality of feature points within a predetermined viewing area.

30. The non-transitory computer-readable medium of claim 29, wherein the instruction to determine the plurality of feature points within the predetermined viewing area further comprise instruction to determine a plurality of feature points within a predefined fovea display area, wherein the plurality of feature points within the predefined fovea display area comprises a grouping of feature points based at least part on a nearest-neighbor interpolation, and wherein the grouping of feature points comprises a subgrouping of feature points grouped based at least part on a depth calculation.

* * * * *